N. G. WARTH.
INNER TUBE FOR PNEUMATIC TIRES.
APPLICATION FILED JULY 18, 1919.

1,429,385.

Patented Sept. 19, 1922.

Inventor
Nathaniel G. Warth
his Attorneys

Patented Sept. 19, 1922.

1,429,385

UNITED STATES PATENT OFFICE.

NATHANIEL G. WARTH, OF COLUMBUS, OHIO.

INNER TUBE FOR PNEUMATIC TIRES.

Application filed July 18, 1919. Serial No. 311,860.

*To all whom it may concern:*

Be it known that I, NATHANIEL G. WARTH, a citizen of the United States, residing at Columbus, in the county of Franklin and State of Ohio, have invented a certain new and useful Improvement in Inner Tubes for Pneumatic Tires, of which the following is a specification.

The object of this invention is to provide an improved form of inner tube for a pneumatic tire adapted to lessen the evils of puncturing.

The invention is embodied in the example herein shown and described, the features of novelty being finally claimed.

In the accompanying drawing—

In the views 6 designates the inner tube. Such tube is formed of soft rubber in a circular vulcanizing mold and without joints or seams, and so that it comes from the mold round or circular in form conforming normally circumferentially to the cavity of the casing except as to the annular outward projection hereinafter referred to.

The tube is also equipped with the usual valve stem (not shown) for inflating it, said stem having a suitable reinforcing mounting placed in the tube prior to the process of vulcanizing it.

Figure 1:
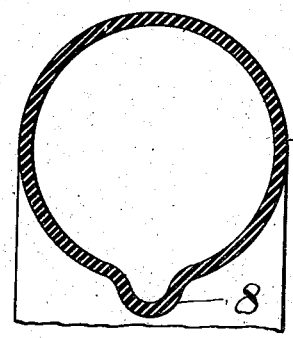
Figure 1 is a cross section of the tube according to my invention.
Figure 2:
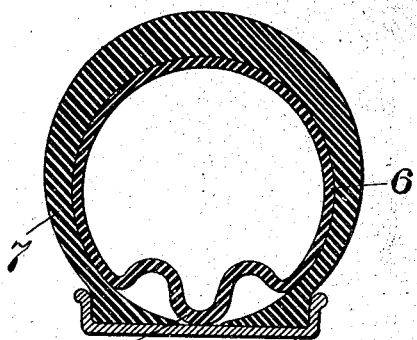
Fig. 2 is a similar section illustrating the same lodged in a tire casing but before inflation.
Figure 3:
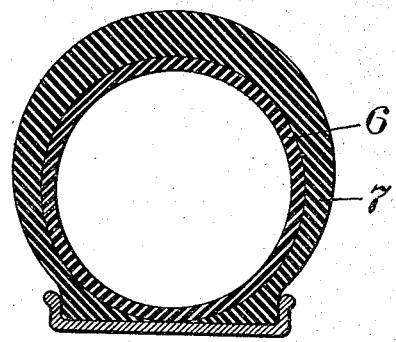
Fig. 3 is a view like Fig. 2 showing the tube inflated.

The tube at its inner side is molded with a circumferential outward protrusion 8 formed upon a curve of smaller radius than that of the cross section of the main body of the tube or so as to contain more rubber at its region than if that portion were made on the aforesaid radius of the tube. The tube is preferably made in its major portion to fit closely the casing 7 when in uninflated condition or as shown in Fig. 2. Hence when such a tube is inflated against the resisting casing and wheel rim the puckered portions of the tube paralleling the portion 8 are forced outward into coincidence with the cavity formed by the casing and rim as shown in Fig. 3. When so forced out a condensation of the rubber takes place principally in the region of the wheel rim but said condensation effect is distributed both circumferentially as respects the entire tube as well as respects its cross section or laterally toward the tread region. In the present instance, therefore, the tube when inflated in such a casing when mounted on a rim is subjected to a double condensation— one mainly circumferential in two directions and the other radial in cross sectional aspect. To obtain the best effect the material of the tube should be of substantial thickness preferably about fifty per centum thicker than usual for a given size of tire. But the thickness of the material can be varied.

The protrusion 8 facilitates the lateral compression of the tube for insertion into the casing.

When placed in the casing and sufficiently inflated the walls of the tube are condensed in every direction against the resisting walls of the casing with the result that when an object penetrating the tube is removed the material reacts or expands in the perforation to close the same and prevent the escape of the inflating air. In most instances the presence of the condensed material of the tube around the puncturing thing even when not removed is sufficient to prevent the deflation of the tube. With this construction, therefore, much of the trouble, expense and delay incident to tire puncturing and "flat tire" is avoided.

The form of the embodiment of the invention can be varied to some extent without departing from the gist of the invention as claimed.

What I claim is:

An inner tube of soft rubber for a pneumatic tire having its main body portion substantially permanently circular in cross section and provided at its inner side with a circumferential outward protrusion from the main body portion said protrusion having its wall of substantially the same thickness as that of the body portion and curved in cross section on an arc of a smaller radius than that of the main body portion and adapted when inserted in the casing and rim to form at each side thereof circumferential inward protrusions subject to compression when the tube is inflated.

NATHANIEL G. WARTH.